(12) United States Patent
McLoughlin et al.

(10) Patent No.: US 11,591,461 B2
(45) Date of Patent: Feb. 28, 2023

(54) COMPOSITIONS FOR POLYOLEFIN FOAMS

(71) Applicant: BRASKEM AMERICA, INC., Philadelphia, PA (US)

(72) Inventors: Kimberly Miller McLoughlin, Pittsburgh, PA (US); Kevin Herrington, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 7 days.

(21) Appl. No.: 17/404,637

(22) Filed: Aug. 17, 2021

(65) Prior Publication Data

US 2021/0388194 A1    Dec. 16, 2021

Related U.S. Application Data

(62) Division of application No. 16/293,090, filed on Mar. 5, 2019, now Pat. No. 11,124,637.

(60) Provisional application No. 62/639,208, filed on Mar. 6, 2018.

(51) Int. Cl.
| | | |
|---|---|---|
| *C08J 9/00* | (2006.01) | |
| *C08J 9/04* | (2006.01) | |
| *C08L 23/36* | (2006.01) | |
| *C08L 23/14* | (2006.01) | |
| *C08L 23/02* | (2006.01) | |

(52) U.S. Cl.
CPC ............... *C08L 23/36* (2013.01); *C08L 23/02* (2013.01); *C08L 23/14* (2013.01); *C08J 2201/03* (2013.01); *C08J 2203/06* (2013.01); *C08J 2203/184* (2013.01); *C08J 2205/052* (2013.01); *C08L 2203/14* (2013.01); *C08L 2205/025* (2013.01); *C08L 2205/12* (2013.01)

(58) Field of Classification Search
CPC .......... C08L 23/36; C08L 23/02; C08L 23/14; C08L 2203/14; C08L 2205/025; C08L 2205/12; C08L 23/26; C08J 2201/03; C08J 2203/06; C08J 2203/184; C08J 2205/052

See application file for complete search history.

(56) References Cited

U.S. PATENT DOCUMENTS

| | | |
|---|---|---|
| 6,174,930 B1 | 1/2001 | Agarwal et al. |
| 6,472,473 B1 | 10/2002 | Ansems et al. |
| 2002/0077379 A1 | 6/2002 | Hughes et al. |
| 2008/0058437 A1 | 3/2008 | Burgun et al. |
| 2013/0079430 A1* | 3/2013 | Jintoku ............... C08J 9/122 521/134 |
| 2016/0222180 A1* | 8/2016 | McLoughlin .......... C08J 9/0033 |
| 2017/0313797 A1 | 11/2017 | Klimke et al. |

* cited by examiner

*Primary Examiner* — Kara B Boyle
(74) *Attorney, Agent, or Firm* — Jeffrey N. Townes; Cozen O'Connor

(57) ABSTRACT

A foamable composition including a polypropylene-based copolymer and a polyolefin is disclosed. The composition can be used to make a stiff foam with a high closed-cell content. Methods for producing the composition and the foam are provided.

20 Claims, No Drawings

COMPOSITIONS FOR POLYOLEFIN FOAMS

PRIORITY CLAIM

This application is a divisional application of U.S. patent application Ser. No. 16/293,090, filed Mar. 5, 2019, which claims priority, under 35 U.S.C. § 119(e), to U.S. Provisional Application No. 62/639,208, filed Mar. 6, 2018, both of which are herein incorporated by reference in their entirety.

FIELD OF THE INVENTION

The invention relates to polyolefins generally. More particularly, the invention relates to a foamable composition and a foam, both of which contain a polyolefin and a polypropylene-based copolymer. The invention also relates to a method of making the composition and the foam.

BACKGROUND

Polypropylene provides a balance of stiffness, chemical resistance, and heat resistance that is desirable in a wide range of applications, including food packaging and many automotive applications. Polypropylene has a favorable environmental footprint, in part because it is readily recyclable. Processing polypropylene to produce a foam provides even greater sustainability benefit by reducing material and weight. Low density polypropylene foams with closed cells are typically produced using commercially available high melt strength polypropylene.

However, there is a need for closed-cell polypropylene foams with a high closed-cell content and higher stiffness than foams produced from commercially available high melt strength polypropylene. Foams possessing these characteristics are attractive for applications such as packaging. For example, a high closed-cell content can minimize the migration of liquids through the foam structure, thereby minimizing leakage. A high stiffness maintains the rigidity of containers filled with liquids to avoid spills.

Therefore, there is an unmet need in the art to produce a polymer composition that can provide closed-cell polyolefin foams with high stiffness. It is a further object of the current invention to produce a closed-cell foam with high stiffness.

SUMMARY OF THE INVENTION

One aspect of the invention relates to a foamable composition, containing: (i) up to about 20 wt % of a polypropylene-based copolymer, based on a total weight of the foamable composition, and (ii) about 80 wt % or more of a polyolefin, based on the total weight of the foamable composition, where the polypropylene-based copolymer has a melt flow rate of about 1 g/10 min or less and a melt strength ranging from about 20 cN to about 100 cN at 190° C., the polyolefin has a melt flow rate of about 2 g/10 min or more, a melt strength of about 30 cN or more at 190° C., and a velocity at break of about 170 mm/s or more, and the foamable composition has a zero-shear viscosity of about 12,000 Pa·s or less at 190° C.

Another aspect of the invention relates to a foam, comprising a polymer composition, containing: (i) up to about 20 wt % of a polypropylene-based copolymer, based on a total weight of the polymer composition, and (ii) about 80 wt % or more of a polyolefin, based on the total weight of the polymer composition, where the polypropylene-based copolymer has a melt flow rate of about 1 g/10 min or less and a melt strength ranging from about 20 cN to about 100 cN at 190° C., the polyolefin has a melt flow rate of about 2 g/10 min or more, a melt strength of about 30 cN or more at 190° C., and a velocity at break of about 170 mm/s or more, the polymer composition has a zero-shear viscosity of about 12,000 Pa·s or less at 190° C., and the foam has a density ranging from about 0.01 g/cc to about 0.20 g/cc, and a closed-cell content of more than about 80%.

Another aspect of the invention relates to a foamable composition, containing: (i) about 1 wt % to about 15 wt % of an impact copolymer, based on a total weight of the foamable composition, and (ii) about 85 wt % to about 99 wt % of a polyolefin, based on the total weight of the foamable composition, where the impact copolymer has a melt flow rate of about 1 g/10 min or less, the polyolefin has a melt flow rate of about 2 g/10 min or more, a melt strength of about 30 cN or more at 190° C., and the foamable composition is a blend.

Another aspect of the invention relates to a foamable composition, containing: (i) up to about 20 wt % of a long-chain branched impact copolymer, based on a total weight of the foamable composition, and (ii) about 80 wt % or more of a polyolefin, based on the total weight of the foamable composition, where the long-chain branched impact copolymer has a melt flow rate of about 1 g/10 min or less, the polyolefin has a melt flow rate of about 2 g/10 min or less, a melt strength of about 30 cN or more at 190° C., and the foamable composition has a zero-shear viscosity of about 10,000 Pa·s or less at 190° C.

DETAILED DESCRIPTION OF THE INVENTION

The present disclosure relates to a foamable composition that provides low density closed-cell foams with substantially higher stiffness than a polypropylene foam produced with commercially available high melt strength polypropylene. It was surprisingly found that the closed-cell content and the stiffness of the foam can be significantly increased by tailoring the polymer composition. Accordingly, one aspect of the invention relates to a foamable composition containing: (a) up to about 20 wt % of a polypropylene-based copolymer, based on a total weight of the foamable composition, (b) about 80 wt % or more of a polyolefin, based on the total weight of the foamable composition. The foamable composition can also include modifications, as well as other components one skilled in the art would typically include in a foamable composition.

The foamable composition can be a polymer blend. As understood by one skilled in the art, the term "polymer" refers to a polymeric compound prepared by polymerizing monomers, whether of the same or a different kind. The generic term "polymer" thus includes the term "homopolymer," which refers to polymers prepared from only one type of monomer, as well as the term "copolymer" which refers to polymers prepared from two or more different monomers. As used herein, the term "blend" or "polymer blend" generally refers to a physical mixture of two or more polymers which are not chemically combined. Such a blend may be miscible and may not be phase separated. The polymer blend may contain one or more domain configurations, which are created by the morphologies of the polymers. The domain configurations can be determined by X-ray diffraction, transmission electron microscopy, scanning transmission electron microscopy, scanning electron microscopy, and atomic force microscopy, or other methods known in the art.

The foamable composition contains the polypropylene-based copolymer in an amount of up to about 20 wt %, or from about 5 wt % to about 20 wt %, including any ranges in between. In some embodiments, the amount of the polypropylene-based copolymer ranges from 1 wt % to about 15 wt %, from about 7 wt % to about 12 wt %, or from about 8 wt % to about 11 wt %, including any ranges in between.

Conversely, the foamable composition can contain about 80 wt % or more of the polyolefin, or from about 80 wt % to about 95 wt %, including any ranges in between, based on the total weight of the foamable composition. In some embodiments, the amount of the polyolefin ranges from about 85 wt % to about 99 wt %, from about 88 wt % to about 95 wt %, or from about 89 wt % to 92 wt %, including any ranges in between.

The foamable composition has a zero-shear viscosity of about 12,000 Pa·s or less at 190° C., or from about 8,000 Pa·s to about 11,500 Pa·s. In some embodiments, the zero-shear viscosity is about 10,000 Pa·s or less. As understood by one skilled in the art, the term "zero-shear viscosity" refers to the viscosity of the melt at a shear rate approaching to zero, and can be determined by methods known in the art such as creep recovery experiments.

A melt flow rate of the foamable composition can be about 11.5 g/10 min or less, about 10 g/10 min or less, or ranges from 5.9 g/10 min to about 9 g/10 min, including any ranges in between. A foamable composition with a melt flow rate outside these ranges may also form a foam with the desirable properties. In some embodiments, the melt flow rate of the foamable composition is measured after one pass in the extruder. As used herein, the term "melt flow rate" (MFR) (units of g/10 min) is described according to and measured per ASTM D1238 using a load of 2.16 kg at 230° C.

A melt strength of the foamable composition is at least 11.5 cN, or ranges from 11.5 cN to about 20 cN. A foamable composition with a melt strength outside these ranges may also form a foam with the desirable properties. As used herein, the term "melt strength" is an engineering measure of the extensional viscosity and is defined as the maximum tension that can be applied to the melt without breaking.

The foamable composition has a velocity at break of at least about 120 mm/s, at least about 140 mm/s, or at least about 160 mm/s. As used herein, the term "velocity at break" refers to the maximum velocity before the melt breaks in extensional flow experiments.

Polypropylene-Based Copolymer

As used herein, the polypropylene-based copolymer refers to copolymers containing at least 50 wt % propylene monomer units, based on the weight of the copolymer. Polypropylene-based copolymers are typically prepared by polymerizing propylene and at least one other linear α-olefin, branched α-olefin, or cyclic olefin. The α-olefin and the cyclic olefin may have 2 to 20 carbon atoms, 2 to 16 carbon atoms, or 2 to 12 carbon atoms, including but not limited to ethylene, 1-butene, 2-butene, 1-pentene, 3-methyl-1-butene, 1-hexene, 4-methyl-1-pentene, 3-methyl-1-pentene, 4,6-dimethyl-1-heptene, 1-octene, 1-decene, 1-undecene, 1-dodecene, 1-tetradecene, 1-hexadecene, 1-octadecene, 1-eicocene, norbornene, tetracyclododecene, and combinations thereof. These olefins may each contain one or more heteroatoms such as an oxygen, nitrogen, and/or silicon atom.

The polypropylene-based copolymer has a melt flow rate of about 1 g/10 min or less, about 0.8 g/10 min or less, or about 0.6 g/10 min or less. The polypropylene-based copolymer has a melt strength at 190° C. ranging from about 20 cN to about 100 cN, from about 20 cN to about 80 cN, or from about 20 cN to about 60 cN. A velocity at break of the polypropylene-based copolymer is at least about 100 mm/s, or ranges from about 100 mm/s to about 150 mm/s, including any ranges in between.

The polypropylene-based copolymer can be made up of linear and/or branched polymer chains. Exemplary polypropylene-based copolymer includes an alternating copolymer, a periodic copolymer, a block copolymer, a random copolymer, or an impact copolymer. In some embodiments, the polypropylene-based copolymer is a random copolymer or an impact copolymer optionally containing long chain branches. As used herein, the term "random copolymer" refers to a copolymer in which the different types of monomer units are statistically distributed in the polymer molecules. The polypropylene-based copolymer can be a polypropylene-polyethylene random copolymer in which the content of the ethylene monomer units can be up to about 7 wt %, up to about 5 wt %, or in a range of about 0.5 wt % to about 5 wt %, including any ranges in between, based on a total weight of the copolymer.

As used herein, the term "impact copolymer" refers to a heterophasic polyolefin copolymer where one polyolefin is the continuous phase (i.e., the matrix) and an elastomeric phase is uniformly dispersed therein. The impact copolymer includes, for instance, a heterophasic polypropylene copolymer where polypropylene homopolymer is the continuous phase and an elastomeric phase, such as ethylene propylene rubber (EPR), is uniformly distributed therein. The polypropylene matrix can make up from about 75 wt % to about 90 wt % of the weight of the impact copolymer. The amount of the elastomeric phase, such as EPR, can be up to about 25 wt %, up to about 20 wt %, up to about 12 wt %, from about 8 wt % to about 12 wt %, or from about 8 wt % to about 10 wt %, including any ranges in between. The elastomeric phase contains ethylene monomer units in an amount of at least about 5 wt %, at least about 10 wt %, at least about 25 wt %, or not more than about 60 wt %, or in a range of about 25 wt % to about 60 wt %, including any ranges in between. The amount of ethylene in the impact copolymer is typically not more than about 12 wt %. The impact copolymer may have a xylenes solubles content of greater than 8 wt % as determined by acetone precipitation. The impact copolymer results from an in-reactor process rather than physical blending.

The impact copolymer may or may not be a coupled polymer, which is a rheology-modified polymer resulting from a coupling reaction. Accordingly, the impact copolymer may or may not contain long chain branches. Each long chain branch may be as long as the polymer backbone to which it is attached. Methods for detecting long chain branches are known to one skilled in the art, for example, $^{13}$C NMR spectroscopy, and gel permeation chromatography coupled to a low angle laser light scattering detector or a differential viscometer detector.

In one embodiment, the impact copolymer contains long chain branches, and can be prepared by reacting a coupling agent with a polymeric precursor such as an impact copolymer without long chain branches.

The polymeric precursor and the coupling agent can be admixed, or otherwise combined, under conditions which allow for sufficient mixing before or during the coupling reaction. Admixing of the polymeric precursor and the coupling agent can be accomplished by any means known to one skilled in the art. For example, the mixing of the polymeric precursor and the coupling agent can occur in any equipment, such as V-blenders, ribbon or paddle blenders, tumbling drums, or extruders (e.g., twin screw extruders). The polymeric precursor and the coupling agent may be physically mixed by simultaneously introducing the polymeric precursor resin and the coupling agent into the feed section of an extruder, such as through a main feed hopper or through multiple feeders. Alternatively, the polymeric precursor and the coupling agent can be added to the extruder from separate feeders. Optionally, the coupling agent may be pre-blended (e.g., dry blended, melt-mixed) with the polymeric precursor in a first extrusion step at a temperature below the reaction temperature of the coupling agent to form a masterbatch. In a second extrusion step, the masterbatch is fed via the feed section to an extruder either separately from or together with the polymeric precursor. In some embodiments, the coupling agent is added in the form of a molecular melt with other ingredients, such as an antioxidant, to the extruder.

During the admixing/combining, it is desirable to have as homogeneous a distribution as possible, to achieve solubility of the coupling agent in the polymer melt, and to avoid uneven amounts of localized reactions. The coupling reaction is implemented via reactive extrusion or any other method which is capable of mixing the coupling agent with the polymeric precursor and adding sufficient energy to cause a coupling reaction between the coupling agent and the polymeric precursor. It may be necessary to activate a coupling agent with heat, sonic energy, radiation or other chemical activating energy, for the coupling agent to be effective for coupling polymer chains. For example, the resulting admixture can be subjected to a heating step to initiate the coupling reaction. The processing conditions (the reaction temperature, the type of reaction vessels, the concentration of the coupling agent, and residence times, etc.) can be varied depending on the characteristics of the polymeric precursor and the coupling agent. For example, the reaction temperature can range from about 190° C. to about 280° C., and the residence time at the reaction temperature can range from 15 seconds to 90 seconds. One skilled in the art understands that a polymer (or mixtures thereof) typically melts over a temperature range rather than sharply at one temperature. Thus, alternatively, it may be sufficient that the polymeric precursor be in a partially molten state. The melting or softening temperature ranges can be approximated from the differential scanning calorimeter (DSC) curve of the polymeric precursor (or mixtures thereof).

As used herein, the coupling agent is capable of insertion reactions into C—H bonds of polymers. The C—H insertion reactions and the coupling agents capable of such reactions are known to one skilled in the art. The coupling agent is capable of generating reactive species (e.g., free radicals, carbenes, or nitrenes) that couple the coupling agent with the polymeric precursor.

In some embodiments, the coupling agent is a poly(sulfonyl azide) that encompasses a compound having multiple sulfonyl azide groups (—$SO_2N_3$). The poly(sulfonyl azide) is any compound having at least two sulfonyl azide groups (—$SO_2N_3$) reactive with the polymeric precursor. Preferably the poly(sulfonyl azide)s have a structure represented by X—R—X, where each X is $SO_2N_3$ and R represents an unsubstituted or inertly substituted hydrocarbyl, hydrocarbyl ether, or silicon-containing group, preferably having sufficient carbon, oxygen, or silicon atoms to separate the sulfonyl azide groups sufficiently to permit a facile reaction between the polymeric precursor and the poly(sulfonyl azide). For example, there can be at least one, at least two, or at least three carbon, oxygen, or silicon atoms between the sulfonyl azide groups. While there is no critical limit to the length of R, each R can have less than about 50, less than about 20, or less than about 15 carbon, oxygen, or silicon atoms. Silicon containing groups include, without limitation, silanes and siloxanes.

Examples of a suitable poly(sulfonyl azide) include but are not limited to 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed poly(sulfonyl azide)s of chlorinated aliphatic hydrocarbons containing an average of from 1 to 8 chlorine atoms and from about 2 to 5 sulfonyl azide groups per molecule, and mixtures thereof. In some embodiments, the poly(sulfonyl azide) is oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide), 1,3-benzenedisulfonyl azide, 1,4-benzenedisulfonyl azide, and bis(4-sulfonyl azidophenyl)methane, a mixture or any combination thereof.

It is believed that other coupling agents can be used, and the coupling reaction would proceed as intended. These coupling agents include peroxides, such as di(4-tert-butylcyclohexyl) peroxydicarbonate, di(tert-butylperoxyisopropyl)benzene, di(tert-butylperoxyisopropyl)benzene, di(4-methylbenzoyl) peroxide, dicetyl peroxydicarbonate, dimyristyl peroxydicarbonate, dicumyl peroxide, dibenzoyl peroxide, diisopropyl peroxydicarbonate, tert-butyl monoperoxymaleate, didecanoyl peroxide, dioctanoyl peroxide, 2,5-dimethyl-2,5-di(tert-butylperoxy) hexane, tert-butylperoxy-2-ethylhexyl carbonate, tert-amyl peroxy-2-ethylhexanoate, tert-amyl peroxyneodecanoate, tert-amyl peroxypivalate, tert-amyl peroxybenzoate, tert-amyl peroxyacetate, di-sec-butyl peroxydicarbonate, di(2-ethylhexyl) peroxydicarbonate, tert-butyl cumyl peroxide or combinations of these non-limiting examples; an alkyl borane, such as triethylborane, trimethylborane, tri-n-butylborane, triisobutylborane, diethylborane methoxide, diethylborane isopropoxide, or combinations of these non-limiting examples; azo compounds, such as azobisisobutyronitrile (AIBN), 1, 1'-azobis(cyclohexanecarbonitrile) (ABCN), 1,1'-azodi(hexahydrobenzonitrile), 2,2'-azodi(hexahydrobenzonitrile), 2,2'-azodi(2-methylbuttyronitrile), or combinations of these non-limiting examples.

Polyolefin

As used herein, the polyolefin generally embraces a homopolymer prepared from a single type of olefin monomer as well as a copolymer prepared from two or more olefin monomers. A specific polyolefin referred to herein shall mean polymers comprising greater than 50% by weight of units derived from that specific olefin monomer, including homopolymers of that specific olefin or copolymers containing units derived from that specific olefin monomer and one or more other types of olefin comonomers. For instance, polypropylene shall mean polymers comprising greater than 50 wt % of units derived from propylene monomer, including polypropylene homopolymers or copolymers containing units derived from propylene monomer and one or more other types of olefin comonomers. The polyolefin used herein can be a copolymer wherein the comonomer(s) is/are randomly distributed along the polymer chain, a periodic copolymer, an alternating copolymer, or a block copolymer comprising two or more homopolymer blocks linked by covalent bonds.

Exemplary polyolefins include those prepared from at least one of a linear α-olefin, a branched α-olefin, and a cyclic olefin, all of which have been described herein.

Typical polyolefins include polyethylene, polypropylene, a copolymer of polyethylene and polypropylene, and a polymer blend containing polyethylene, polypropylene, and/or a copolymer of polyethylene and polypropylene. For example, the polyolefin can be a polypropylene homopolymer that contains more than about 99 wt % of propylene monomer.

The polyolefin may or may not be a coupled polymer. In some embodiments, the polyolefin is a coupled polymer, being the reaction product of a semi-crystalline polyolefin, such as a polypropylene homopolymer, and a coupling agent such as a poly(sulfonyl azide). The polyolefin may be prepared by methods described herein for the coupled impact copolymer (e.g, by replacing the polymeric precursor with the semi-crystalline polyolefin) or by methods described in U.S. patent application Ser. No. 15/010,099, filed on Jan. 29, 2016, and assigned to Braskem America, Inc., which is incorporated herein by reference in its entirety.

The semi-crystalline polyolefin can be a homopolymer that does not contain long chain branches. Examples of a suitable semi-crystalline polyolefin include, but are not limited to, a polypropylene, or a polyethylene, or combinations thereof. Examples of polypropylene include but are not limited to a polypropylene homopolymer. For example, a polypropylene homopolymer having a melt flow rate of at least 1.8 g/10 min, or a melt flow rate ranging from about 15 g/10 min to about 40 g/10 min, or from about 15 g/10 min to about 25 g/10 min, including any ranges in between, can be used in the present disclosure. The crystallinity of the semi-crystalline polyolefin can be at least 50%, or ranges from about 60% to about 90%, or from about 70% to about 80%, including any ranges in between. Crystallinity can be measured by methods known in the art such as DSC.

The content of the coupling agent, such as the poly(sulfonyl azide), is at least 500 ppm, or ranges from about 500 ppm to about 6,500 ppm, or from about 3,000 ppm to about 6,500 ppm, including any ranges in between, based on the total weight of the polyolefin.

The polyolefin has a melt flow rate of about 2 g/10 min or more, or from about 2 g/10 min to about 20 g/10 min. The polyolefin has a melt strength of about 30 cN or more at 190° C., or from about 30 cN to about 100 cN, or from about 30 cN to about 80 cN. The polyolefin has a melting temperature of at least 140° C., at least about 160° C., or from about 160° C. to about 170° C. A crystallization temperature of the polyolefin is at least about 120° C., or at least about 130° C. The melting and crystallization temperatures of the polyolefins can be measured by methods known in the art such as differential scanning calorimetry (DSC).

The polyolefin has a melt drawability of at least about 170 mm/s, or about 170 mm/s to about 250 mm/s. A flexural modulus of the polyolefin is greater than about 240,000 psi, or ranges from about 240,000 psi to about 350,000 psi. As used herein, the term "flexural modulus" is described according to and measured per ASTM D790. The polyolefin has a heat distortion temperature under load of 66 psi (DTUL@ 66 psi) greater than 101° C. and typically not more than 120° C. As used herein, the term "heat distortion temperature under load (DTUL)" is described according to and can be measured per ASTM D-648. The polyolefin has a ratio of melt strength to melt flow rate of greater than 18 and typically not more than 100.

The foamable composition typically further comprises a filler (e.g., wood, silica, glass, clay, and other polymers), an additive (e.g., a nucleating agent), or both.

The foamable compositions of the present invention can include any conventional plastics additives in any combination. The amount should not be wasteful of the additive. Those skilled in the art of thermoplastics compounding, with reference to such treatises as Plastics Additives Database (2004) from Plastics Design Library (www.elsevier.com), can select from many different types of additives for inclusion into the compounds of the present invention.

Non-limiting examples of additives or oligomers are adhesion promoters; antioxidants (e.g., antioxidants containing thioether, phosphite, or phenolic units); flame retardants; biocides (antibacterials, fungicides, and mildewcides); anti-fogging agents; anti-static agents; bonding, blowing and foaming agents; dispersants; fillers (e.g., glass fibers) and extenders; smoke suppressants; expandable char formers; impact modifiers; initiators; acid scavengers; lubricants; micas; pigments, colorants and dyes; plasticizers; processing aids; other polymers; release agents; silanes, titanates and zirconates; additional slip agents; anti-blocking agents; stabilizers such as hindered amine light stabilizers; stearates (e.g., calcium stearate); ultraviolet light absorbers; viscosity regulators; waxes; antiozonants; organosulfur compounds; nucleating agents (e.g., talc); and combinations thereof.

Antiblock additives are often used together with slip additives and for their complementary functions. Antiblock additives reduce adhesion or the "stickiness" between polymer layers (usually layers of the same polymer), which is created by blocking forces inherent to many polymers. Whereas slip additives decrease friction caused from moving across the surface of a polymer, antiblock additives create a microrough surface that lessens the adhesion caused by these blocking forces. Antiblock additives, like slip additives, are commonly used to improve the handling of a polymer for applications such as packaging. For instance, a non-migratory antiblock additive, such as crosslinked poly(methyl methacrylate) or inorganic silica, can be used.

Method for Producing the Foamable Composition

The polypropylene-based copolymer and the polyolefin can be dry-blended in a gravimetric mixing feeder. The resultant mixture can be fed to an extruder and then extruded by means known in the art using the extruder (or other apparatus). Alternatively, the polypropylene-based copolymer and the polyolefin can be added separately to the extruder and the mixing of the polymers occurs in the extruder. The term "extruder" takes on its broadest meaning and includes any machine suitable for polyolefin extrusion. For instance, the term includes machines that can extrude polyolefins in the form of powder or pellets, sheets, fibers, films, blow molded articles, foams, or other desired shapes and/or profiles. Generally, an extruder operates by feeding material through the feed throat (an opening near the rear of the barrel) which comes into contact with one or more screws. The rotating screw(s) forces the material forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front.

The vessel can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

After extrusion, the foamable composition can be solidified, optionally pelletized and stored, transported, and then re-heated with a blowing agent and foamed at any time after the composition is produced.

Foam

Another aspect of the invention relates to a foam, comprising a polymer composition, containing: (i) up to about 20 wt % of the polypropylene-based copolymer, based on a total weight of the polymer composition, and (ii) about 80 wt % or more of the polyolefin, based on the total weight of the polymer composition, where the foam has a density ranging from about 0.01 g/cc to about 0.20 g/cc, and a closed-cell content of more than about 80%.

Foams have a cellular core structure created by the expansion of a blowing agent. A blowing agent is a substance which is capable of creating voids in a polymer matrix thereby producing a foam. The blowing agent can be a physical blowing agent, a chemical blowing agent, or both. Exemplary physical blowing agents include liquefied hydrocarbons (e.g., pentane, isopentane, cyclopentane, butane), liquid carbon dioxide, nitrogen, hydrochlorofluoroolefins (e.g., 1-chloro-3,3,3-trifluoropropene, 2-chloro-3,3,3-trifluoropropene, and dichloro-fluorinated propene), hydrofluoroolefins (3,3,3-trifluoropropene, 1,2,3,3,3-pentafluoropropene, cis- and/or trans-1,3,3,3-tetrafluoropropene, and 2,3,3,3-tetrafluoropropene), and combinations thereof. An amount of the physical blowing agent can be up to 1 wt %, including any fraction ranges in between, based on a total weight of the polymer composition. Chemical foaming agents (CFAs) release gasses upon thermal decomposition. Exemplary chemical blowing agents include azo compounds (e.g., azodicarbonamide), hydrazine derivatives (e.g., p-toluenesulfonylhydrazide, p,p'-oxybis (benzenesulfonylhydrazide), benzenesulfonyl hydrazide, p-toluenesulfonyl acetone hydrazone), carbazides (e.g., p-toluenesulfonylsemicarbazide, p,p'-oxybis (benzenesulfonylsemicarbazide)), tetrazoles (e.g., 5-phenyltetrazole), nitroso compounds (e.g., N,N'-dinitroso-pentamethylenetetramine), carbonates (e.g., sodium bicarbonate), those sold under trade names of SAFOAM®, HYDROCEROL®, and ECOCELL®, or any combinations thereof. An amount of the chemical blowing agent can be up to 0.10 wt %, including any fraction ranges in between, based on the total weight of the polymer composition.

The foam structure has at least two phases, a polymer matrix and voids. The foam described herein has a closed-cell structure. In closed-cell foams, the voids are completely enclosed by cell walls and the voids are not interconnected with other voids by open passages. The foam has a closed-cell content of more than about 80%, more than about 85%, or more than about 90%. The closed-cell structure can be determined qualitatively by dipping a sample of the foam strand into a solution of isopropanol and dye. Closed cells are indicated if the alcohol/dye solution does not penetrate the foamed sample. Alternatively, the content of closed-cell can be determined using a pycnometer or indirectly from the ASTM D6226 method.

The foam has a cell count ranging from about 1.0 million cells/inch$^3$ to about 2.0 million cells/inch$^3$, or from about 1.2 million cells/inch$^3$ to about 1.7 million cells/inch$^3$. The cell count can be obtained by methods known in the art, for example, by calculating the number of cells in an unit area in an optical micrograph.

The polymer composition is capable of being used to make a low density foam having any suitable density, which may be in the range from about 0.005 g/cc to about 0.60 g/cc, from about 0.01 g/cc to about 0.20 g/cc, or from about 0.10 g/cc to about 0.20 g/cc.

The foam has a shear modulus (i.e., foam modulus) of about 12,000 Pa or more and typically not more than 20,000 Pa at 20° C. In some embodiments, the foam has a shear modulus of 2,500 Pa or more and typically not more than 5,000 Pa at 100° C. As understood by one skilled in the art, the term "shear modulus" describes the response of the material to shear stress, and is defined as the ratio of shear stress to the shear strain. Shear modulus is also commonly referred to as the modulus of rigidity. The shear modulus is measured by methods known to one skilled in the art, for example, dynamic mechanical analysis and ASTM D4065.

The foam disclosed herein exhibit unexpected improved properties including but not limited to high closed-cell content and high rigidity.

Method for Producing the Foam

The foam can be prepared with a single extrusion in an extruder such as one or more single-screw extruders or a twin-screw extruder. In some embodiments, the pelletized foamable composition is blended with any of the fillers and/or additives listed herein, and/or melted at an increased temperature before the blowing agent is added.

In other embodiments, the copolymer, polyolefin, and the blowing agent can be pre-blended in a gravimetric feeder and then fed to the extruder. In some embodiments, the extruder has a cooling barrel extension and an integrated static mixer. The total L/D ratio can be at least 40, although other ratios are possible. The extrusion throughput can be at least 22 kg/hr, although higher or slower throughputs are possible. The resultant mixture can be combined with a physical blowing agent, such as liquefied carbon dioxide, in an extruder fitted with a die. The extruder melts the mixture and mixes it with the physical blowing agent. The resulting melt mixture would then be extruded through the die. A pressure drop at the die would provide for expansion of the blowing agent(s), and the polymer composition would form a foam. Optionally, the die geometry could provide for a foamed strand or a foamed sheet to be produced. In the case of an annular die, the foam could be drawn over a mandrel, then cooled and slit. The diameter of the annular die can be at least 50 mm, although larger or smaller diameters are possible, depending on the desired size of the foam. A ratio of the die diameter to the mandrel diameter can be at least 2:1, although other ratios are possible.

A sheet or a fabricated article comprising the polymer composition having a resulting foam structure can be made following the foaming step. The sheet or the fabricated article can be used in packaging, automotive, and insulation applications. Examples of a fabricated article include but are not limited to thermoformable, foamed films and sheets, lightweight packaging trays, beakers and containers, microwaveable food packaging, technical foams for automotive applications such as headliners, carpet backing, door liners, parcel shelves, water shields, under-the-hood acoustic panels, cushioning and protective packaging, and thermal and acoustic insulation, and any other suitable article or combination thereof.

Another aspect of the invention relates to a foamable composition, containing: (i) about 1 wt % to about 15 wt % of an impact copolymer, based on a total weight of the foamable composition, and (ii) about 85 wt % to about 99 wt % of a polyolefin, based on the total weight of the foamable composition, where the impact copolymer has a melt flow rate of about 1 g/10 min or less, the polyolefin has a melt flow rate of about 2 g/10 min or more, a melt strength of about 30 cN or more at 190° C., and the foamable composition is a blend. A foam containing such a composition can have a density ranging from about 0.01 g/cc to about 0.20 g/cc and a closed-cell content of more than about 90%.

Another aspect of the invention relates to a foamable composition, containing: (i) up to about 20 wt % of a long-chain branched impact copolymer, based on a total weight of the foamable composition, and (ii) about 80 wt % or more of a polyolefin, based on the total weight of the foamable composition, where the long-chain branched impact copolymer has a melt flow rate of about 1 g/10 min or less, the polyolefin has a melt flow rate of about 2 g/10 min or more, a melt strength of about 30 cN or more at 190° C., and the foamable composition has a zero-shear viscosity of about 10,000 Pa·s or less at 190° C. A foam containing such a composition can have a density ranging from about 0.01 g/cc to about 0.20 g/cc and a closed-cell content of more than about 90%.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are given as particular embodiments of the invention and to demonstrate the practice and advantages thereof. It is to be understood that the examples are given by way of illustration and are not intended to limit the specification or the claims that follow in any manner.

Foamable Composition

The foamable compositions containing polymer A and polymer B are summarized in Table 1. Polymer A is a high melt strength modified polypropylene homopolymer produced by reacting polypropylene with a poly(sulfonyl azide). Polymer B is a polypropylene-based copolymer, which can be a random copolymer (RCP), an impact copolymer (ICP), or a long-chain branched impact copolymer (LCB-ICP). Following the weight percentages listed in Table 1, appropriate amounts of the polymer pellets were dry-blended with additives in a gravimetric mixing feeder. The resultant mixture was melted in an extruder and then extruded.

Zero-Shear Viscosity

The zero-shear viscosity of the foamable composition was measured using an Anton Paar MCR 501 rheometer with a 25-mm 6° cone and plate fixture. Samples were tested using a 0.445-mm gap and allowed to equilibrate at 200° C. for 10 minutes. A creep recovery experiment was run in stress controlled mode. A force of 100 Pa was applied for 500 s and the sample strain was recorded. The force was stopped and sample allowed to recover for 1200 s.

The zero-shear viscosity was calculated from the creep phase using:

$$\eta = \frac{t*\tau}{\sigma}$$

where $\eta$ is the viscosity of the material, t is time, $\tau$ is the shear stress, and a is the strain on the material taken when $t/\sigma$ reached steady state.

Melt Flow Rate

As used herein, the term "melt flow rate" (MFR) (units of g/10 min or dg/min) is described according to and measured per ASTM D1238 using a load of 2.16 kg at 230° C.

Rheotens Melt Strength

The extensional flow of the polymer melt was characterized using a Göttfert Rheotester 2000 capillary rheometer equipped with a Rheotens 71.97 set-up. The analysis determines the resistance of the polymer melt to stretching (i.e., melt strength) and its extensibility in a given test condition.

A 12-mm capillary barrel was used at a barrel temperature of 190° C. The molten polymer was soaked at the test temperature for 5 minutes prior to the test. A polymer strand was pushed through a 20-mm/2-mm L/D capillary die with a 180° entrance angle at an apparent wall shear rate of about 86 $s^{-1}$. The polymer strand was then fed into the Rheotens unit and grabbed by two sets of two wheels. The wheel speed was adjusted to reduce the acting force on the polymer strand to approximately zero. Once steady-state was achieved, the speed of the counter-rotating wheels was continuously increased, which deformed the polymer strand until fracture and/or slippage. The polymer strand resistance force to deformation was measured by the Rheotens unit. The peak force recorded during the drawing process is referred to as "melt strength." The peak velocity is referred to as "velocity at break."

Foam Extrusion

Polymer pellets were dry-blended with other additives using a 4-component, gravimetric mixing feeder. ECO-CELL® 20P, supplied by Polyfil, was added as a chemical blowing agent (0-0.10 wt %).

The foam extrusion system consists of a single screw extruder with a cooling barrel extension and an integrated static mixer to provide a total extruder L/D=40. Extrusion throughput rate was 22 kg/hr. Liquid carbon dioxide (1 wt %) was used as a physical blowing agent and added directly to the extruder barrel through a positive displacement pump.

The extruder was fitted with a 50-mm annular die, and the extrudate was stretched over a mandrel and then slit. The ratio of die diameter to mandrel diameter (blow up ratio) was 2:1.

Density Measurement

Density, p, was determined by using a 100-mm² square piece of sample. The mass (m) measured on an analytical balance was divided by the volume calculated from the dimensions, length (l), width (w) and height (h) of the sample measured with a caliper, according to the equation:

$$\rho = \frac{m}{l\,w\,h}$$

Closed-Cell Content

The closed-cell content was measured using a Quantichrome Ultrafoam 1200e pycnometer (V5.04). Each sample was cut into three pieces with an approximate area of 3-inch. The exact dimensions of the pieces were measured by a caliper and entered into the equipment to calculate the total volume, $V_{(geometric)}$.

First, the mass of $N_2$ gas required to stabilize the pressure of an empty cylinder of known volume to 3 psig was measured. This was the calibrating amount of gas. Then, the sample was placed in the cylinder, the cylinder sealed, the calibrating amount of gas was introduced, and the resulting pressure was measured. The pressure difference between the empty cylinder and the cylinder holding the sample is proportionally related to the volume occupied by the closed cells of sample present, $V_{(pycnometer)}$, because the gas diffuses into the open cells. The closed-cell content was calculated according to the expression:

$$\%\text{ Closed cell} = \frac{V_{(pycnometer)}}{V_{(geometric)}} \times 100$$

Cell Count

Foam cell morphology was analyzed through high definition images acquired using an optical microscope (Hirox) with magnification at 35× or 50×, depending on the cell density. A small sample of foamed sheet was cut with a surgical blade along a diagonal relative to the machine direction. The cut surface was colored using a blue ink marker to enhance visual contract, and the sample was placed on the microscope stage. The micrograph area, A ($\mu m^2$), and cell count, $N_A$, were recorded. The number of cells per unit area, $N_A$, was used to calculate the number of cells per volume, N, using this equation:

$$N = \left(\frac{N_A}{A}\right)^{\frac{3}{2}}$$

Modulus of Foam

The mechanical responses of polymer foams were measured over a broad range of temperatures using dynamic mechanical analysis (DMA). Samples were tested in shear mode using a DMA Q800 instrument produced by TA Instruments. Foamed sheets were cut to test pieces with an area of 10 $mm^2$. Two equal-size pieces of the same material were sheared between a fixed and moveable plate at a strain of 0.1% as temperature was increased from −100° C. to +150° C. The shear modulus, G', was reported as a function of temperature.

The dynamic mechanical properties of the foamed PP sheets were measured in shear using an RDA III rheometer (TA Instruments) outfitted with a torsion/rectangular fixture. All of the samples were die-cut parallel to the machine direction (MD). In addition, a sample was analyzed in the transverse direction (TD). Data were collected over the temperature range using a 3° C./minute heating rate and a 1 Hz deformation frequency. All measurements were made in a dry nitrogen environment. While a formal error analysis was not performed on these samples, based on historical data on homogeneous samples, the dynamic moduli are estimated to be accurate to within ±10%.

Properties of the Foamable Composition and the Foam

The experimental results for the foamable composition and the foam are presented in Table 1. The properties of each polymer are shown in Table 2.

Comparative Example 1 is polymer A, which is a high melt strength polypropylene. Inventive Example 1 is a blend of polymer A with 10% of a random copolymer (RCP). Comparative Example 2 is a blend of polymer A with 20% RCP. Inventive Example 2 is a blend of polymer A with 10% of a long-chain branched impact copolymer (LCB-ICP). Inventive Example 3 is a blend of polymer A with 20% LCB-ICP. Inventive Example 4 is a blend of polymer A with 10% of an impact copolymer (ICP). Comparative Example 3 is a blend of polymer A with 20% ICP.

Table 1 shows that all polymer blends (Inventive Examples 1-4 and Comparative Examples 2 and 3) have higher melt strengths than Comparative Example 1. Inventive Examples 1-4 have lower zero-shear viscosities than Comparative Examples 2 and 3.

All foams containing the polymer blends are stiffer (as shown by the higher foam moduli) than Comparative Example 1 at 20° C. Further, Inventive Examples 2 and 4 are stiffer than Comparative Example 1 at 100° C. Inventive Examples 1-4 have closed-cell contents of more than 80%, which are higher than the closed-cell contents of Comparative Examples 2 and 3. Further, Inventive Examples 2 and 4 have closed-cell contents of at least 90%, which are higher than the closed-cell contents of Inventive Examples 1 and 3.

TABLE 1

Experimental data for inventive and comparative examples that include foamable compositions and foams

| | Example Polymer | Comp Ex 1 Polymer A | Invention Ex 1 Polymer A + 10% RCP | Comp Ex 2 Polymer A + 20% RCP | Invention Ex 2 Polymer A + 10% LCB-ICP | Invention Ex 3 Polymer A + 20% LCB-ICP | Invention Ex 4 Polymer A + 10% ICP | Comp Ex 3 Polymer A + 20% ICP |
|---|---|---|---|---|---|---|---|---|
| Composition | wt % Polymer A | 100 | 90 | 80 | 90 | 80 | 90 | 80 |
| | wt % Polymer B | 0 | 10 | 20 | 10 | 20 | 10 | 20 |
| | Velocity at break (mm/s) | 224 | 166 | 169 | 173 | 167 | 169 | 165 |
| | Final melt strength (cN) | 11.3 | 12.3 | 14.7 | 13.2 | 12.4 | 11.7 | 12.1 |
| | Zero-shear viscosity at 190° C. (Pa · s) | 6250 | 11180 | 17294 | 8192 | 10685 | 8707 | 12335 |
| | Melt flow rate after blending* (g/10 min) | 11.4 | 6.2 | 3.7 | 8.1 | 5.9 | 7.7 | 5.8 |
| Foam properties | Foam density, g/cc | 0.17 | 0.20 | 0.27 | 0.19 | 0.19 | 0.18 | 0.21 |
| | Foam cell count, million cells/$in^3$ | 1.0 | 1.4 | 3.1 | 1.3 | 1.7 | 1.3 | 1.06 |
| | % closed cells in foam | 94 | 83 | 35 | 92 | 84 | 90 | 33 |
| | Foam modulus G' at 20° C. (Pa) | 8276 | 10345 | 13793 | 13793 | 12414 | 12414 | 17241 |
| | Foam modulus G' at 100° C. (Pa) | 2069 | 2069 | 3207 | 2759 | 1931 | 2759 | 3793 |
| Comments | | | Baseline | Low closed-cell content | | | | Low closed-cell content |

*Melt flow rate measured after one pass in the extruder

TABLE 2

Properties of each polymer prior to blending

| | | | Polymer B | |
|---|---|---|---|---|
| Polymer | Polymer A | RCP | LCB-ICP | ICP |
| Melt flow Rate | 2.5 | 0.5 | 0.5 | 0.5 |
| wt % ethylene propylene rubber | 0 | 0 | 10 | 10 |

TABLE 2-continued

Properties of each polymer prior to blending

| Polymer | Polymer A | RCP | Polymer B LCB-ICP | ICP |
|---|---|---|---|---|
| Melt strength (cN) | 48 | 49 | 59.5 | 23.3 |
| Velocity at break (mm/s) | 178 | 106 | 133 | 110 |

We claim:

1. A foam, comprising a polymer composition, comprising:
    about 5 wt % to about 20 wt % of a polypropylene-based copolymer, based on a total weight of the polymer composition, and
    about 80 wt % to about 95 wt % of a polyolefin, based on the total weight of the polymer composition,
    wherein:
    the polypropylene-based copolymer has a melt flow rate of about 1 g/10 min or less and a melt strength ranging from about 20 cN to about 100 cN at 190° C.,
    the polyolefin has a melt flow rate of about 2 g/10 min or more, a melt strength of about 30 cN or more at 190° C., and a velocity at break of about 170 mm/s or more,
    the polymer composition has a zero-shear viscosity of about 12,000 Pa·s or less at 190° C., and the foam has a density ranging from about 0.01 g/cc to about 0.20 g/cc, and a closed-cell content of more than about 80%.

2. The foam of claim 1, wherein the foam has a cell count ranging from about 1.0 million cells/inch³ to about 2.0 million cells/inch³.

3. The foam of claim 1, wherein the foam has a shear modulus of about 10,000 Pa or more at 20° C.

4. The foam of claim 1, wherein the polypropylene-based copolymer is a random copolymer or an impact copolymer optionally containing long-chain branches.

5. The foam of claim 1, wherein the foam has a closed-cell content of more than about 90%.

6. The foam of claim 1, wherein the polymer composition has a melt flow rate of about 11.5 g/10 min or less.

7. The foam of claim 1, wherein the polyolefin is a reaction product of:
    a semi-crystalline polypropylene homopolymer having a crystallinity of at least 50%, and at least 500 ppm of a poly(sulfonyl azide), based on a total weight of the polyolefin
    wherein the polyolefin has a flexural modulus greater than about 240,000 psi.

8. The foam of claim 1, wherein the foam further comprises a filler, an additive, or both.

9. The foam of claim 1, wherein the polypropylene-based copolymer has a melt flow rate of about 0.6 g/10 min or less.

10. The foam of claim 2, wherein the foam has a cell count ranging from about 1.2 million cells/inch³ to about 1.7 million cells/inch³.

11. The foam of claim 6, wherein the polymer composition has a melt flow rate of about 5.9 g/10 min to about 9 g/10 min.

12. A foam, comprising a polymer composition, comprising:
    about 5 wt % to about 20 wt % of a long-chain branched impact copolymer, based on a total weight of the polymer composition, and
    about 80 wt % to about 95 wt % of a polyolefin, based on the total weight of the polymer composition,
    wherein:
    the long-chain branched impact copolymer has a melt flow rate of about 1 g/10 min or less,
    the polyolefin has a melt flow rate of about 2 g/10 min or more, a melt strength of about 30 cN or more at 190° C.,
    the polymer composition has a zero-shear viscosity of about 10,000 Pa·s or less at 190° C., and
    the foam has a density ranging from about 0.01 g/cc to about 0.20 g/cc, and a closed-cell content of more than about 90%.

13. The foam of claim 12, wherein the long-chain branched impact copolymer has a melt flow rate of about 0.6 g/10 min or less.

14. The foam of claim 12, wherein the polyolefin is a reaction product of:
    a semi-crystalline polypropylene homopolymer having a crystallinity of at least 50%, and
    at least 500 ppm of a poly(sulfonyl azide), based on a total weight of the polyolefin,
    wherein the polyolefin has a flexural modulus greater than about 240,000 psi.

15. The foam of claim 12, wherein the foam further comprises a filler, an additive, or both.

16. The foam of claim 12, wherein the polymer composition has a melt flow rate of about 11.5 g/10 min or less.

17. The foam of claim 16, wherein the polymer composition has a melt flow rate ranging from about 5.9 g/10 min to about 9 g/10 min.

18. The foam of claim 12, wherein the foam has a cell count ranging from about 1.0 million cells/inch³ to about 2.0 million cells/inch³.

19. The foam of claim 18, wherein the foam has a cell count ranging from about 1.2 million cells/inch³ to about 1.7 million cells/inch³.

20. The foam of claim 12, wherein the foam has a shear modulus of about 12,000 Pa or more at 20° C.

* * * * *

UNITED STATES PATENT AND TRADEMARK OFFICE
CERTIFICATE OF CORRECTION

PATENT NO. : 11,591,461 B2
APPLICATION NO. : 17/404637
DATED : February 28, 2023
INVENTOR(S) : Kimberly Miller McLoughlin et al.

It is certified that error appears in the above-identified patent and that said Letters Patent is hereby corrected as shown below:

In the Claims

In Claim 2, Column 15, Lines 29-30, please delete "1.0 million cells/inch' to about 2.0 million cells/inch'" and replace it with "1.0 million cells/inch$^3$ to about 2.0 million cells/inch$^3$"

Signed and Sealed this
Twenty-third Day of January, 2024

Katherine Kelly Vidal
*Director of the United States Patent and Trademark Office*